United States Patent [19]

Shinada

[11] Patent Number: 4,572,520
[45] Date of Patent: Feb. 25, 1986

[54] MULTI-COMPONENT STEEL PISTON RING WITH ROTATION PREVENTING RIVET

[75] Inventor: Masatoshi Shinada, Saitama, Japan

[73] Assignee: Nippon Piston Ring Co., Ltd., Tokyo, Japan

[21] Appl. No.: 754,297

[22] Filed: Jul. 12, 1985

[30] Foreign Application Priority Data

Jul. 18, 1984 [JP] Japan .................. 59-107641[U]

[51] Int. Cl.⁴ .................................................. F16J 9/06
[52] U.S. Cl. .................................. 277/140; 277/146; 277/216; 267/1.5
[58] Field of Search .................. 277/138–141, 277/146, 166, 216, 223; 267/1.5

[56] References Cited

U.S. PATENT DOCUMENTS

| | | | |
|---|---|---|---|
| 1,494,140 | 5/1924 | Small | 277/146 |
| 1,549,201 | 8/1925 | Marshall | 277/146 |
| 2,025,334 | 12/1935 | Teetor | 267/1.5 |
| 3,346,264 | 10/1967 | Hamm | 277/141 |

FOREIGN PATENT DOCUMENTS 418624  9/1974  U.S.S.R. ................. 277/141

Primary Examiner—Robert S. Ward
Attorney, Agent, or Firm—Finnegan, Henderson, Farabow, Garrett & Dunner

[57] ABSTRACT

A piston ring for control of the oil on a cylinder wall that is comprised of thin upper and lower ring members disposed to contact the cylinder wall and an intermediate corrugated expander-spacer. The upper ring member has a headed rivet with the upper head disposed to engage a groove in the piston while the lower head engages an opening defined by the corrugation of the expander-spacer. In such a manner the upper ring member and the expander-spacer are prevented from rotating with respect to the piston.

5 Claims, 4 Drawing Figures

MULTI-COMPONENT STEEL PISTON RING WITH ROTATION PREVENTING RIVET

BACKGROUND OF THE INVENTION

The present invention relates to a multi-component oil control piston ring for use in an internal combustion engine. More particularly, the invention relates to a particular ring structure that prevents rotation of the ring within the ring groove.

In a piston engine of the horizontally opposed type, when the engine is horizontal, the location of the ring gap is generally immaterial. If, however, the engine is inclined and the ring gap is located on the lower portion of the cyclinder, lubricating oil may flow through the gap and collect in the combustion chamber. If the engine is started in that condition, the lubricating oil in the combustion chamber burns and the residual carbon contaminates the interior surface of the combustion chamber. This residue prevents the complete combustion of fuel in the combustion chamber and thereby gives rise to a reduction in the output of the engine. In addition, there is a waste of lubricating oil which may also result in its depletion from the lubrication system. In such an event, there is every likelihood that seizure may eventually occur between the piston ring and the cylinder wall.

In order to overcome these drawbacks, it has hitherto been conventional to employ the ring configuration shown in FIGS. 3 and 4. Referring to FIG. 3, one of the ends of a corrugated expander-spacer 1 defining a joint 11 in the expander-spacer has an extension 12 which is engaged in a drain hole (not shown) in the piston ring groove. This prevents the expander-spacer from rotating in the groove.

Referring to FIG. 4, a thin upper cylinder engaging ring 2 member has a projection 21 which is engageable in one of the open spaces defined by the expander-spacer 1. This prevents the upper ring member from rotating in relation to the expander-spacer 1.

The conventional method as hereinabove described has, however, the disadvantage of being inapplicable when the ring member 2 is formed from a brittle material. It is also complicated, as it involves two different ways for holding the expander-spacer and the ring members to prevent rotation.

Under these circumstances, it is an object of this invention to provide a steel oil control ring which can be held against rotation by only a single method which is applicable to even a cylinder engaging ring member formed from a brittle material.

SUMMARY OF THE INVENTION

To achieve these and other objectives, the present invention comprises a piston ring disposed to fit within the annular groove of a piston. The piston ring comprises a circular, radially-corrugated expander-spacer with the corrugations defining openings in the expander-spacer. An upper annular ring member is disposed adjacent the upper surface of the expander-spacer The upper ring member has a headed rivet passing therethrough. The upper head projects above the upper surface of the upper ring member and the lower head projects below the lower surface of the upper ring member into one of the openings defined by the corrugations in the expandr-spacer. The upper head of the rivet is disposed to engage a groove in the piston such that the upper ring member is prevented from rotating with respect to the piston. A lower annular ring member is disposed adjacent the lower surface of the expander-spacer. Preferably, the rivet has heads that project from the surfaces of the upper ring member an amount of from 0.3 to 1.0 mm.

The objectives and advantages of the present invention will be achieved by practice of the invention as illustrated in the preferred embodiment depicted herein.

DESCRIPTION OF THE PREFERRED EMBODIMENTS

The invention will now be described with reference to the accompanying drawings.

In accordance with the invention, there is provided a piston ring disposed to fit within the annular groove of a piston. As embodied in the device depicted in FIG. 1, the piston ring is generally shown in a piston 4 having an annular piston ring goove 5 positioned in a cylinder 6.

Figure 3:
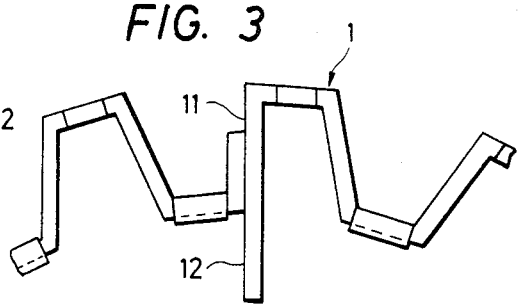
FIG. 3 is a front-elevational view showing the ring gap of a conventional piston ring.
Figure 4:
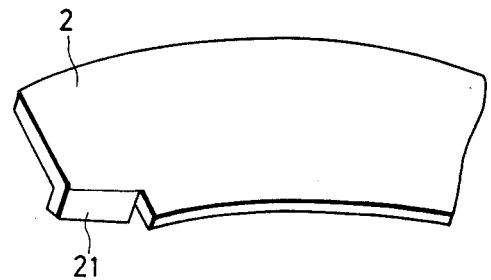
FIG. 4 is a fragmentary perspective view of the upper member of a conventional piston ring.

In accordance with the invention, the piston ring includes a circular, radially-corrugated expander-spacer having corrugations defining openings in the expander-spacer. As here embodied and depicted in FIG. 1, the expander-spacer 1 having the same general configuration as the expander-spacer 1 depicted in FIG. 3 is disposed within the piston ring groove 5.

In accordance with the invention, an upper annular ring member is disposed adjacent the upper surface of the expander-spacer. As here embodied, the upper ring member 2 is disposed adjacent the upper surface 14 of the radially-corrugated expander-spacer 1. The upper ring member 2 has a headed rivet 3 passing therethrough within the hole 22 depicted in FIG. 2. The upper head 32 projects above the upper surface 24 of the upper ring member 2.

In accordance with the invention, the upper head of the rivet is disposed to engage a groove in the piston, such that the upper member is prevented from rotating with respect to the piston. As here embodied, the upper head 32 is confined within the radial groove 51 in the piston 4. Hence, any gap in the upper ring member 2 is maintained in a fixed circumferential position with respect to the piston 4. As such, the ring member 2 cannot rotate within the annular ring groove 5 to a position where the gap in the upper ring member 2 could allow the passage of oil from the crankcase of the internal combustion engine into the combustion chamber.

Figure 1:
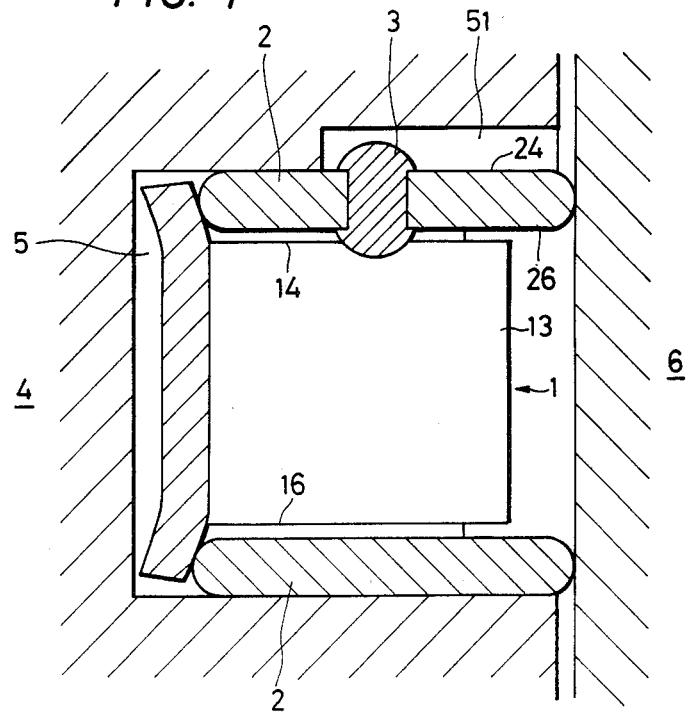
FIG. 1 is a vertical cross-sectional view of a piston ring embodying the present invention, disposed in a piston ring groove.

In accordance with the invention, the lower head of the rivet projects below the lower surface of the upper ring member into one of the openings defined by the corrugations in the expander-spacer. As here embodied, the lower head 31 of the rivet 3 projects below the lower surface 26 of the upper ring member 2. As is depicted in FIG. 1, it also projects below the upper surface 14 of the expander-spacer 1, therefore, the expander-spacer is inhibited in rotating circumferentially within the piston ring groove 5 by the lower rivet head 31. As a result, the rivet, by means of its upper and lower heads, eliminates circumferential rotation of the expander-spacer 1 and the upper ring member 2 with respect to the piston 4.

In accordance with the invention, the ring further includes a lower annular ring member disposed in the lower surface of the expander-spacer. As here embodied, the lower ring member 2' is disposed adjacent the lower surface 16 of the expander-spacer 1.

In the embodiment depicted, the rivet 3 may be located in the vicinity of the ring gap or expansion joint in the upper ring member 2 or it may be situated in another position on the upper ring member. It is preferred that the upper and lower heads of the rivet have a thickness of approximately 0.3 to 1.0 mm from the surface from which they project. In other words, it is preferred that the upper head 32 of the rivet 3 project to up above the surface 24 in the amount set out above. Similarly, that amount of projection is also preferred for the head 31 projecting below the surface 26. Where the rivet projects substantially the same amount above and below the upper and lower surfaces of the upper ring member respectively, the upper ring member is reversible and can be assembled to form the invention without regard to which of its surfaces are considered to be its upper and lower surfaces.

Figure 2:
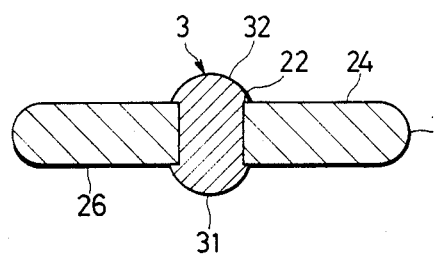
FIG. 2 is a cross-sectional view of one component of the invention showing a rivet passed therethrough.

It is further preferred that the material comprising the rivet be plastically deformable to facilitate the formation of the rivet heads 32 and 31 as depicted in FIGS. 1 and 2. It is preferred that the rivet be comprised of copper. The present invention is applicable to piston rings having upper and lower ring member comprised of a brittle material, such as steel.

The present invention is effective for holding the corrugated expander-spacer against rotation relative to the piston, thereby solving the problems in the prior art of oil leakage due to location of the ring gap with respect to the cylinder wall. In addition, the present invention provides an inexpensive means of manufacturing an oil control ring that can be prevented from rotating with respect to the piston, as well as preventing rotation of the central expander-spacer member with respect to the upper and lower ring members.

The present invention has been disclosed in terms of a preferred embodiment. The invention is, however, not limited thereto and is defined solely by the appended claims and their equivalents.

What is claimed is:

1. A piston ring disposed to fit within the annular groove of a piston, said piston ring comprising:
    a circular, radially-corrugated expander-spacer having corrugations defining openings in said expander-spacer;
    an upper annular ring member disposed adjacent the upper surface of said expander-spacer, said upper ring member having a headed rivet passing therethrough with an upper head projecting above said upper surface of said upper ring member and a lower head projecting below the lower surface of said upper ring member, said lower head projecting into one of said openings defined by said corrugations in said expander-spacer, said upper head of said rivet being disposed to engage a groove in said piston such that said upper ring member is prevented from rotating with respect to said piston; and
    a lower annular ring member disposed adjacent the lower surface of said expander-spacer.

2. The piston ring of claim 1 wherein both said upper head and said lower head project from the respective surfaces of said upper ring member the same amount.

3. The piston ring of claim 2 wherein said amount is about from 0.3 to 1.0 mm.

4. The piston ring of claim 1 wherein the material of said rivet is plastically deformable to facilitate the formation of said rivet heads.

5. The piston ring of claim 4, wherein said material of said rivet is copper.

* * * * *